April 19, 1932.  C. A. OLSON  1,854,421
CONDENSER
Filed March 7, 1931   10 Sheets-Sheet 5

April 19, 1932. C. A. OLSON 1,854,421
CONDENSER
Filed March 7, 1931 10 Sheets-Sheet 6

April 19, 1932.  C. A. OLSON  1,854,421
CONDENSER
Filed March 7, 1931   10 Sheets-Sheet 7

INVENTOR
Claude A. Olson
by his attorneys

April 19, 1932.   C. A. OLSON   1,854,421
CONDENSER
Filed March 7, 1931   10 Sheets-Sheet 8

INVENTOR
Claude A. Olson

April 19, 1932.    C. A. OLSON    1,854,421
CONDENSER
Filed March 7, 1931    10 Sheets-Sheet 9

INVENTOR
Claude A. Olson
by his attorneys

April 19, 1932. C. A. OLSON 1,854,421
CONDENSER
Filed March 7, 1931 10 Sheets-Sheet 10

INVENTOR

Patented Apr. 19, 1932

1,854,421

UNITED STATES PATENT OFFICE

CLAUDE A. OLSON, OF CHICAGO, ILLINOIS, ASSIGNOR TO NATIONAL RADIATOR CORPORATION, OF JOHNSTOWN, PENNSYLVANIA, A CORPORATION OF DELAWARE

CONDENSER

Application filed March 7, 1931. Serial No. 520,887.

My invention relates to an improvement in condensers, and more particularly condensers formed of a plurality of cast metal sections arranged in superimposed relationship and of the type employed in the condensation of hydrocarbon vapors, as for instance, condensers used in connection with oil-cracking stills where the pressures are comparatively low, and from other distillation units widely used in the oil industry.

Condensers comprised of cast metal sections arranged in superimposed relation are commonly used in the oil refining industry. It is quite common to provide a series of sections arranged one above the other in what is referred to as a "stack". In use, a plurality of stacks are commonly arranged in side-by-side relation in a large tank and the tank is either filled with water to a depth sufficient to submerge the stacks, or the stacks are arranged in such manner that water may be sprayed over them. In installations of this kind the hot gases of distillation are supplied through a manifold to the top section of the stacks and the condensate is drawn off through a manifold leading from the bottom of the stacks.

In order to secure the best results it is desirable to have in each stack a plurality of sections of different types constructed to function best in the particular location with reference to the incoming gases. When the gases initially enter the condenser, their volume is relatively large, but as they cool and condensation begins to take place, the fluid volume diminishes. In order to reduce external piping, the condensate from one unit mingles with that of others, so that there is a large bulk of liquid requiring ample passageways to prevent the building up of back pressures.

The present invention provides a stack having a series of cooperating sections especially designed for cooperation with each other.

The sections, moreover, in order to have sufficient capacity, are quite large, so that they weigh considerably. Frequently, a section in a stack has to be replaced. The present invention contemplates a novel arrangement for supporting the various sections and permitting of their ready replacement with a minimum disturbance to other sections in the same stack.

Furthermore, it has been quite common to increase the heat dissipating surface of the sections by the provision of fins on the exterior of the sections. Where this is done, deposits of sediment build up between the fins and over the surface of the sections, decreasing the conductivity of the sections, and reducing their efficiency. Being less able to give up their heat rapidly, greater corrosion from the hot gases also results. This exterior surface, because of the presence of the fins, can only be cleaned with difficulty.

According to the present invention, there is provided an arrangement wherein the sections, while having increased heat dissipating area, have a smooth exterior. The sediment collects less rapidly on the smooth outer surface of the sections than it does on the corrugated sections, and it can be removed with greater facility from the smooth surfaces.

The invention contemplates the provision of other improvements which simplifies the assembly of the stack and which lead to simplicity and greater efficiency in the construction and operation thereof, as will be hereinafter more fully described.

The invention may be explained in connection with the accompanying drawings which show a present preferred embodiment of my invention and in which.

In the drawings I have illustrated each stack as being six sections high and I have illustrated three stacks, two of them closely spaced, while the third is spaced from the other two a distance equal to the width of a stack merely to show a typical arrangement of the stacks. It will be understood, however, that this is merely by way of illustration, as the stacks are commonly arranged in units comprising several stacks, and the number of sections in a stack depends on the particular installation in which the sections are employed. Ordinarily, a stack would never have less than four sections.

In the drawings the uppermost two sections in the stack are the initial condensing sections. These have been marked "A", and are designated in an installation as the "A sections". Below these are the intermediate sections which are marked "B" and which I term the "B sections". The two A sections are exactly alike and the two B sections are exactly alike. Below the B section in each stack is a "C section". Each stack will ordinarily have only a single C section, and below this is the "D section", which is the lowermost section, and a stack may have one or more of these D sections. Incidentally, the D sections are used in the space between the two spaced-apart stacks for connecting the C sections of these spaced-apart stacks. While I have shown two A and B sections in a stack, only one of each of these sections, or more than two of them could be employed.

Each A section, preferably formed as an integral casting, has three horizontally extending legs or barrels, designated $2^a$, $2^b$ and $2^c$ connected by reversely curved portions $2^d$ and $2^e$. The details of this section are best shown in Figures 4, 5, 6 and 7. At the free end of the barrel $2^a$ and on the top surface thereof is a vertically directed passage $2^f$. There is preferably formed around the passage $2^f$ a groove $2^g$ adapted to receive a gasket, as hereinafter described. At this end of the section there are also integral lugs or extensions $2^h$ having bolt holes therein. A lead-in pipe 3 sets on the connecting portion $2^f$, and bolts 4 passing through the lugs $2^h$ secure the connection 3 onto the top section. The connection 3 may lead to a suitable manifold (not shown), and as will be readily understood by those skilled in the art.

On the end of the barrel $2^c$ is a similar connector, also designated $2^f$, but which is directed downwardly instead of upwardly. On the top of the leg $2^c$ near the free end thereof is an upstanding lug $2^k$ having a V-shaped notch in the top thereof, this lug being integral with the section, and projecting higher above the surface of the barrel than the outlet connection $2^f$ projects. The purpose of this arrangement is shown clearly in Figures 1 and 2 wherein the lug $2^k$ of the second A section is shown as supporting the barrel $2^a$ of the A section above it, and at the end opposite the connection 3. By reason of the lug $2^k$ being higher than the connection $2^f$, the upper section A has a transverse inclination, although the barrels themselves are horizontal in a longitudinal direction.

Figure 1:
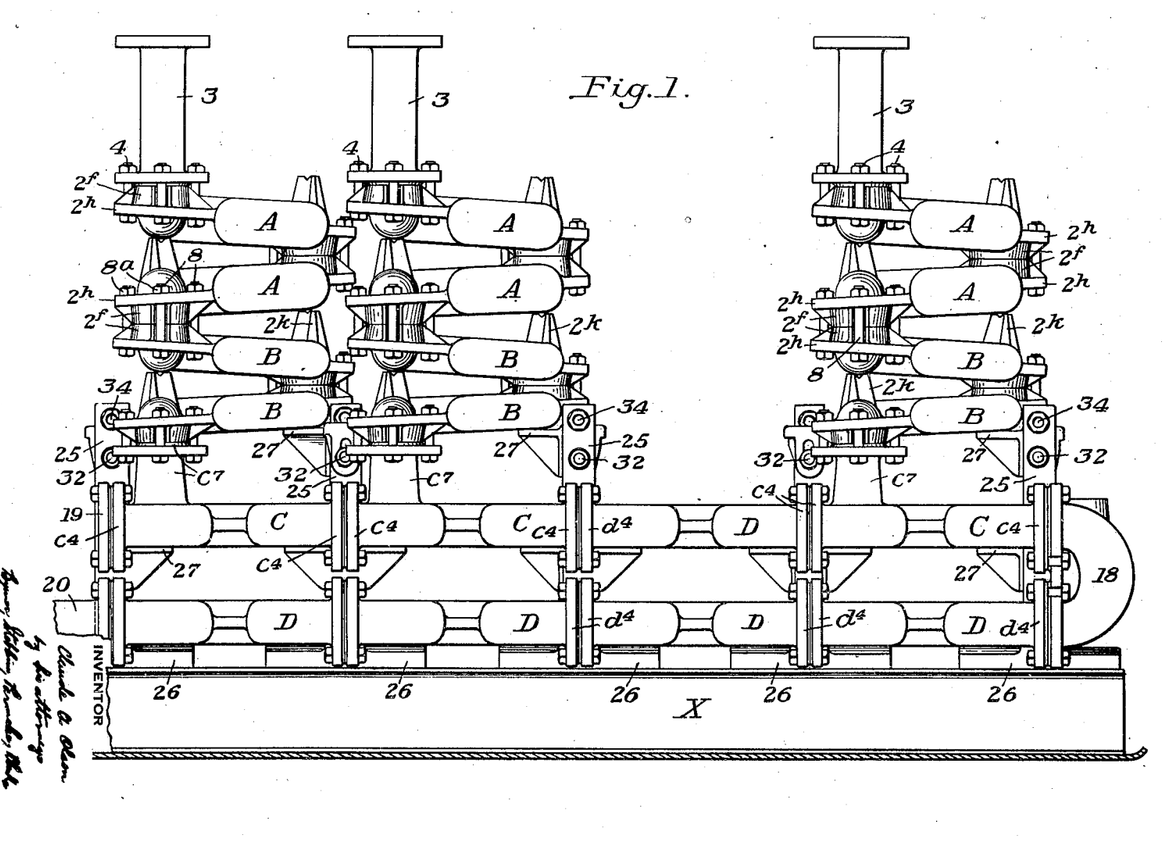
Figure 1 represents an end elevation of a condensing unit comprising a series of stacks, this elevation being viewed from what may be termed the "front end" of the stack.

In Figure 1 where the view is taken at the front of the stack, the inclination is downwardly toward the right for the first A section. The second A section is inclined to the same extent but downwardly to the left. This, of course, is reversed in Figure 2 where the view is from the opposite end of the stack. The construction of the A sections is such that they are reversible or interchangeable, and any number of A sections may be superimposed in this same way.

In order to have the desired resistance to corrosion, the sections are preferably cast from a ferrous alloy containing a substantial percentage of nickel and copper in the proportion in which these metals are found in Monel metal, as described in the application of Young and du Pont, filed February 12, 1931, Serial No. 515,270. This alloy is of a hardness which does not permit of ready machining.

Figures 8, 9:
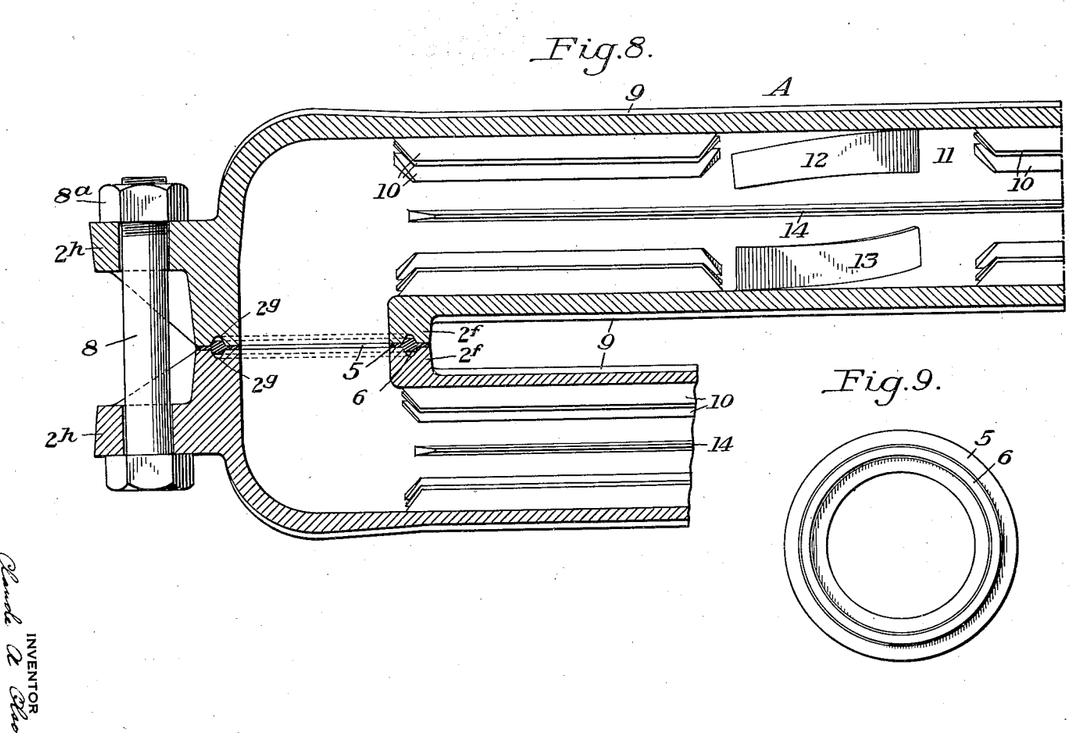
Figure 8 is a longitudinal vertical section through the connecting portion of two adjacent sections.
Figure 9 is a detail view showing one of the gaskets used in the joint between the sections.
Figures 10, 11, 12:
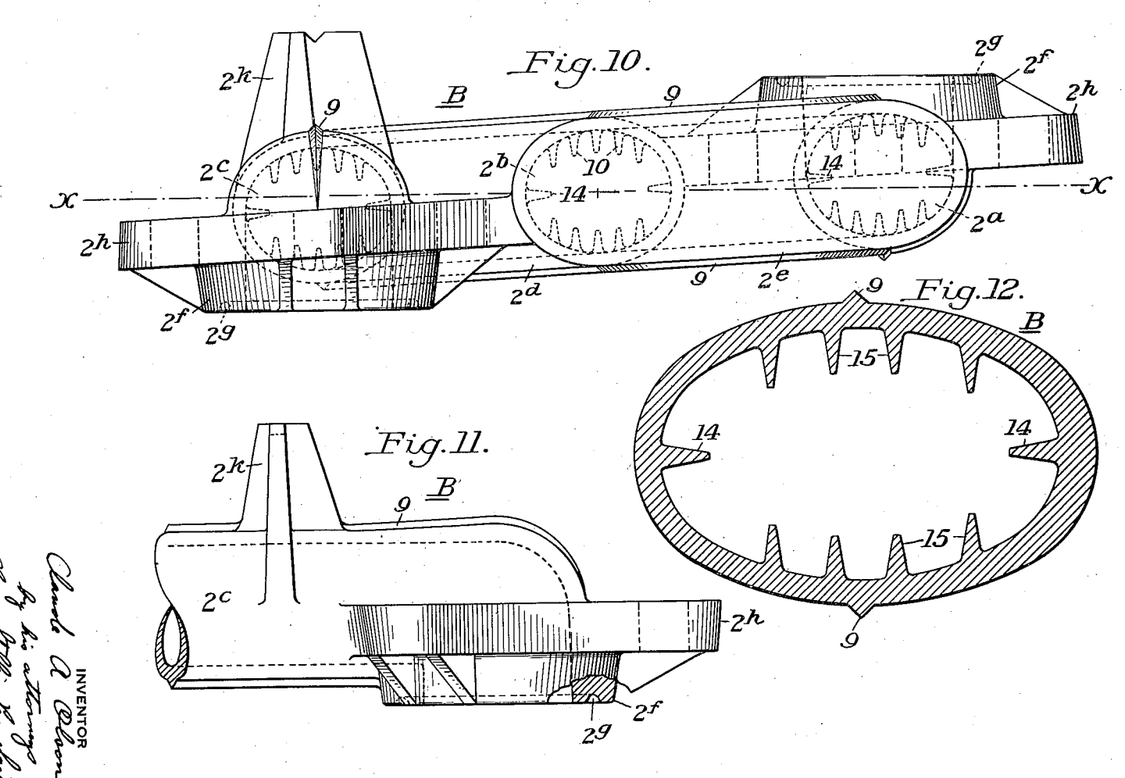
Figure 10 is an end elevation similar to Figure 5 of the second type of section in the stack, coming below the A section, and hereinafter designated the "B section"
Figure 11 is a detail view of the end of one of the A or B sections.
Figure 12 is a typical cross-section through the bend of one of the B sections.
Figures 13, 14, 15, 16:
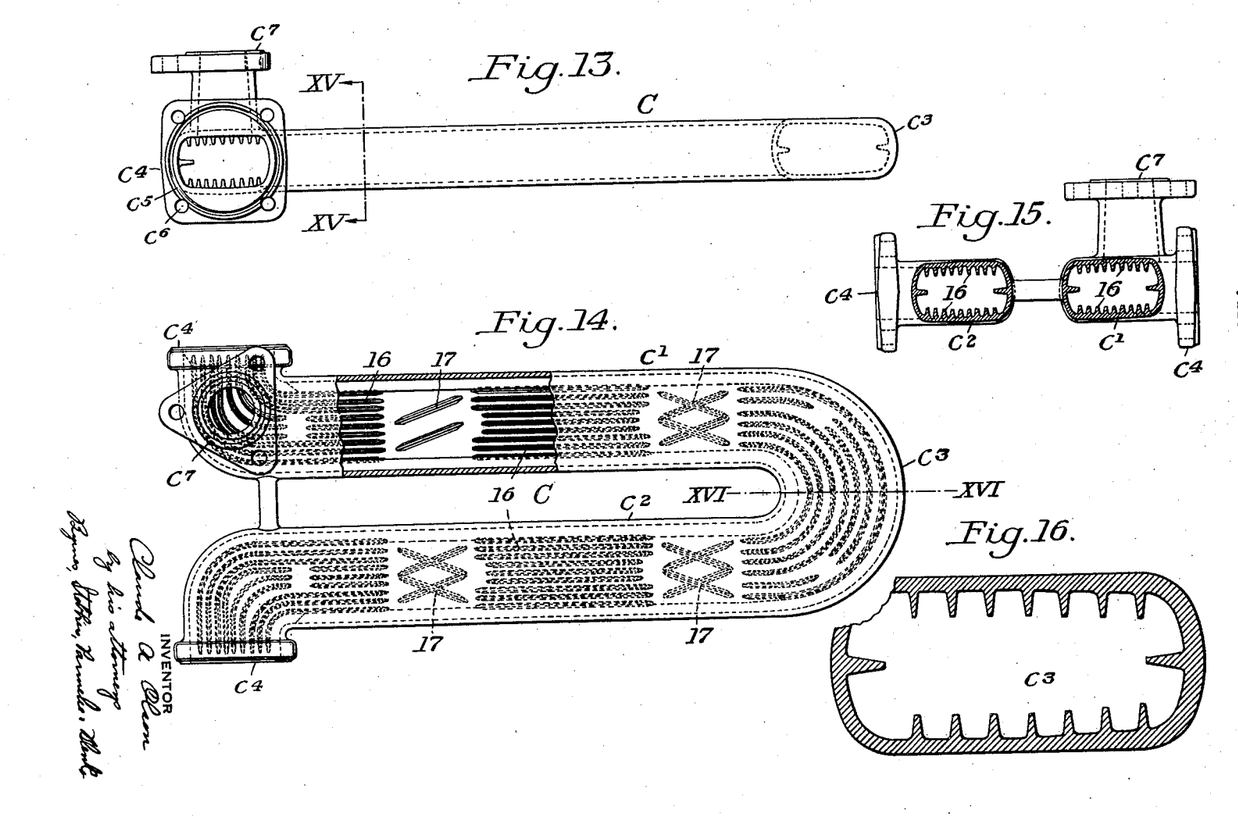
Figure 13 is a side elevation of the section which comes immediately below the B section and hereinafter designated the "C section"
Figure 14 is a top plan view of the section shown in Figure 13.
Figure 15 is a transverse vertical section in the plane of line XV—XV of Figure 13.
Figure 16 is a section in the plane of line XVI—XVI of Figure 14.
Figures 17, 18, 19, 20:
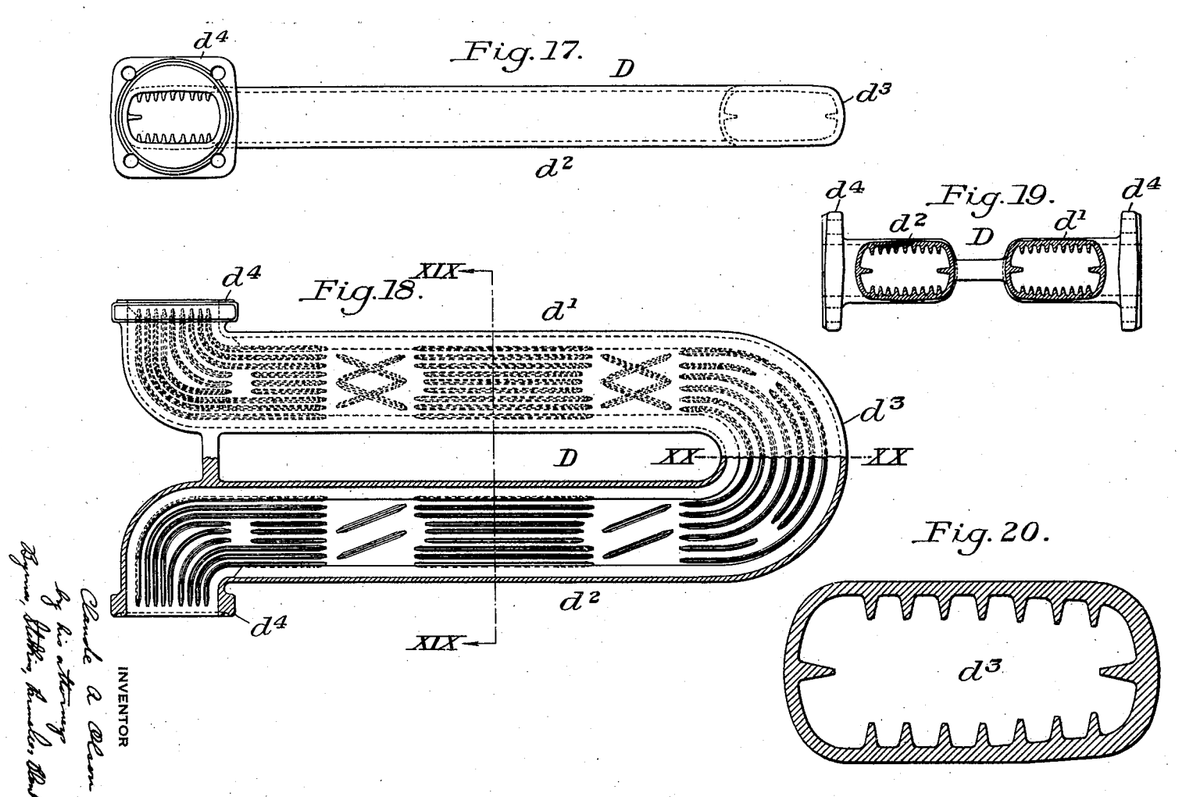
Figure 17 is a side elevation of the lowermost section or sections in the stack, hereinafter referred to as the "D section"
Figure 18 is a top plan view of the D section.
Figure 19 is a transverse vertical section in the plane of line XIX—XIX of Figure 18.
Figure 20 is a transverse vertical section through the bend in substantially the plane of line XX—XX of Figure 18.

To provide the joint between the A sections and between the A sections and the inlet connection 3, the groove $2^g$ is preferably cast in the connector portion $2^f$ when the section is formed. The joint between the A sections and also between the A and B sections and between the B sections is best shown in Figure 8. The groove $2^g$ in the connector portion $2^f$ of the upper section registers with the groove in the lower section, as shown in Figure 8, and interposed between the faces of the connector portion $2^f$ is a gasket 5, preferably formed of asbestos, but which may be formed of a soft metal, and which has a central rib 6 that engages in the registering channels or grooves $2^g$. The rib is of insufficient height to engage the bottom of the grooves and its width is also less than the width of the grooves, as otherwise the gaskets would prevent the adjoining surfaces from being drawn tightly together. Bolts 8 passing through the holes in the lugs or pads $2^h$ and provided with nuts $8^a$ hold this gasket in compression. The cooperating grooves in the end faces of the sections facilitate the centering of the gasket and enable it to be retained in place while the sections are being adjusted relatively to each other and prevent the gaskets from being so placed that they are off-center and prevent their projecting into the passageway through which communication between the sections is established. A similar gasket is provided in the joint between the top A section and the inlet connection 3.

Extending longitudinally of the top and the bottom of the barrels along the central part thereof is a V-shaped rib 9 which is substantially continuous and which serves two functions. When the sections are placed under a cooling spray instead of being immersed, the rib on the top of the barrel serves to divide the flow of the falling water and direct it down each side of the barrel. The flowing water naturally tends to adhere to the surface of the barrel until it reaches the underside, and the rib on the underside serves to provide a central point from which the water will drop onto the section immediately beneath it. If this rib were not provided on the underside of the surface the flow of water from the underside of one barrel to the top of the next would be uneven, and would follow such irregularities as would naturally develop in the dropping of the water if the rib were not present. At the point where the lug $2^k$ supports the barrel, this rib engages the V-shaped notch in the top of the lug to facilitate the lining up of the sections when they are initially being secured together.

Figures 4, 5, 6, 7:
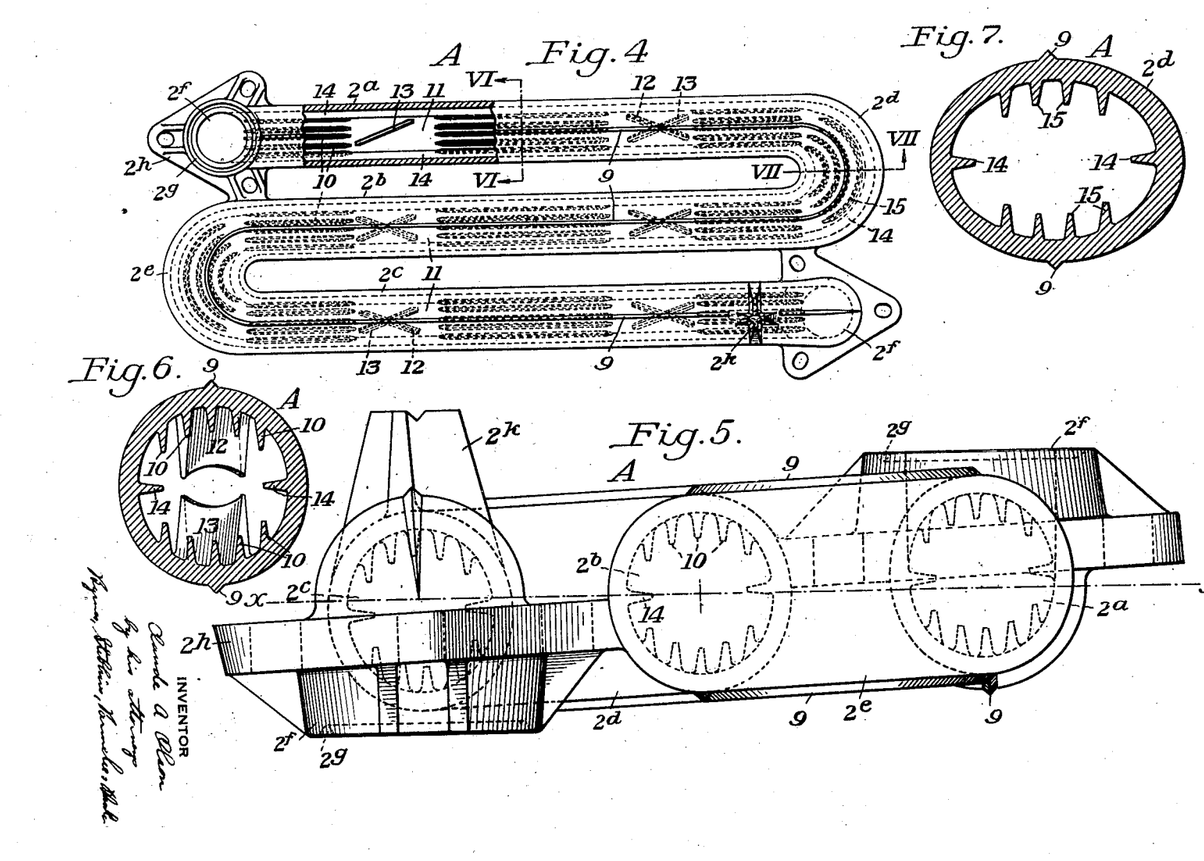
Figure 4 is a top plan view of one of the uppermost sections, hereinafter termed the "A section"
Figure 5 is an end view on a larger scale of this section.
Figure 6 is a cross-section on the plane of line VI—VI of Figure 4.
Figure 7 is a similar section through one of the bends on the plane of line VII—VII of Figure 4.
Figure 21:
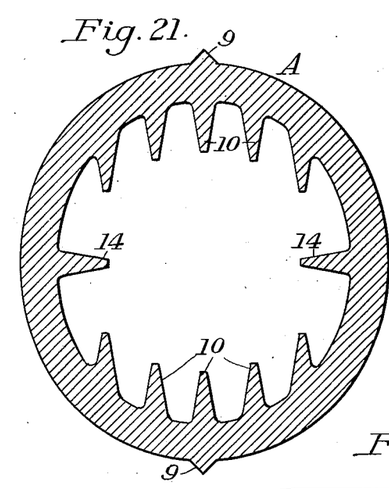
Figure 21 is a full size section through the barrel of one of the A sections.

Except for the rib 9 extending along the top and bottom of the barrels, the outer surface of each barrel is substantially smooth and unbroken. Within each of the barrels of the section are a plurality of longitudinally extending integral fins 10 of substantial depth. The fins are all perpendicular to a horizontal plane and are all of substantially the same height. These fins are interrupted at intervals, as indicated at 11, and wherever such interruption occurs there are two diagonal fins 12 and 13, one on the bottom of the section and one on the top, the diagonal fins or baffles 12 and 13 being reversed with respect to each other and they are higher than the fins 10. There is also an internal horizontal fin 14 at each side of the barrel formed at the parting line of the mold in which the section is produced. As indicated in Figures 6 and 21, the barrels of the A section are substantially circular, or preferably elliptical with the major axis, vertical in cross-section and have relatively thick walls. However, at the bends $2^d$ and $2^e$ the sections have the major axis extending in a horizontal plane. These bends are also provided with internal ribs 15.

The purpose of the internal ribs or fins is to increase the inside area of the barrel and provide a large surface against which the hot gases and distillates can contact and thereby dissipate the heat from the distillate as rapidly as possible. By reason of the fact that the fins extend longitudinally, the gases will sweep along the inside of the barrel without encountering such resistance as transverse ribs would offer. Moreover, such distillate as accumulates can easily wash along the fins. There will, of course, by reason of the large internal surface area of the section, be a tendency for the gases immediately adjacent the walls of the barrel to be retarded by friction, whereas the gases at the center of the barrel will flow through at high velocity without giving up their heat. The transverse baffles 12 and 13 break up any stratification and straight line flow such as would result if the internal fins were continuous, but do not restrict or impede to any appreciable extent the flow of gases and liquids through the section.

Figure 22:
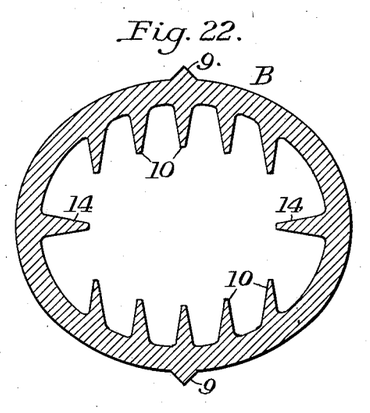
Figure 22 is a similar view through the barrel of one of the B sections.
Figure 23:
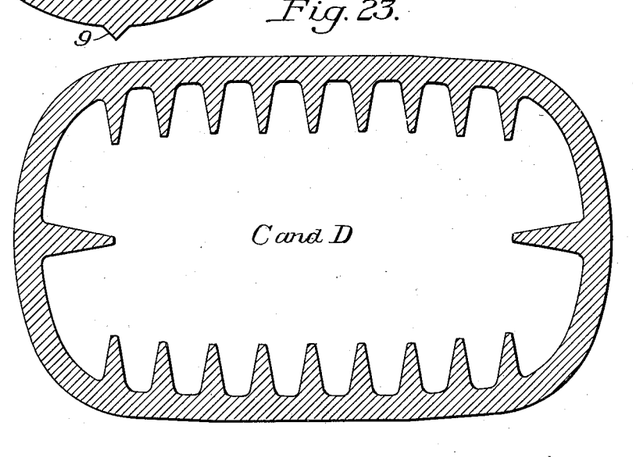
Figure 23 is a similar view through the barrel of either section C or D, these being the same.

Structurally, the B sections are similar to the A sections and similar reference numerals have been used to designate the corresponding parts. However, as shown in Figure 22 particularly, the barrels of the B sections are of less wall thickness and are slightly elliptical with the major axis horizontal, instead of vertical as in the A section, and the inner cross-sectional area of the barrel is less than the area of the barrels of the A sections. The reason for this is that when the distillate first enters the condenser the volume of gases is relatively large and there is a relatively small amount of liquid. In order to get the greatest cooling effect for the gases, it is desirable to have them wipe over the metal surfaces at a considerable velocity and to have a relatively large metal surface. After travelling through the A sections, however, a substantial degree of cooling has been effected, a considerable amount of the distillate has been condensed, and by reason of cooling, the volume of the remaining gases has diminished considerably. In order to effectively cool these remaining gases, however, and prevent the building up of a back pressure in the A sections, it is desirable that the remaining gases travel at a high velocity. By diminishing the cross-sectional area of the B sections, there is less space available for the diminished volume of gas, so that a substantial velocity for the remaining gases is maintained. At the same time since a considerable portion of the distilate is now in a liquid condition, and consequently settles in the bottom of the barrel, the elliptical cross-section of the barrel gives a greater area of contact with the metal and consequently more efficient cooling than the circular barrel of the A section would give for the same volume of liquid.

The outlet connection $2^f$ for the lowermost B section discharges directly into the C section which is under it. The C section is shown in detail in Figures 13 to 16, inclusive. This section has substantially the same overall width as the A and B sections, which have the same overall width and the same overall length, but instead of having three barrels the C section has only two barrels, designated $c^1$ and $c^2$, these barrels being connected at one end by a bend portion $c^3$. The free ends of the barrels have oppositely turned flanged connector portions $c^4$. The flanged connector portion $c^4$ is provided with a circular groove $c^5$, and is also provided with bolt holes $c^6$. At the free end of the leg $c^1$ of each C section is a vertical connector portion $c^7$ which registers with the connector portion $2^f$ of the B section immediately above it. The upper end of the connector portion $c^7$ is provided with a groove for the reception of a gasket the same as that shown in Figure 9. A flange surrounding the connector portion is provided with bolt holes so that the connector portion $c^7$ can be bolted directly to the portion $2^f$ of the B section above it.

By reason of the provision of this vertical riser or connector portion $c^7$ on each of the C sections, and by providing a C section in each stack, the system of manifolds and pipes heretofore required in assemblies of this kind is eliminated.

The barrel of the C sections are oblong or elliptical in cross-section with the major axis in a horizontal plane. Due to the fact that there are only two barrels in each section instead of three as in the A and B sections, the width of each barrel is relatively large. The advantage of this is that the distillate, when it reaches the C section, is almost entirely liquid and the function of the C sections and those to which it delivers is merely to cool the liquid. Since the C and D sections of a plurality of stacks communicate, the cross-sectional area of the barrels of these sections is sufficient to accomodate the accumulated distillate of several stacks. This eliminates much external piping and provides for the cooling of the distillate without building up back pressures in the upper part of the condenser. The cross-sectional shape of the barrels, moreover, provides a greater wall area proportionately to the depth of the liquid in the sections than would a circular barrel. The barrels are smooth on their outer surface, but are provided with longitudinally extending internal fins 16, these being provided on the upper and lower internal surfaces of the barrel, similar to the ribs 10 of the A and B sections. They are interrupted at intervals as shown for the provision of the upper and lower diagonal baffles 17 arranged similarly to the baffles 12 and 13 of the A and B sections.

In the wider C sections there are two upper and two lower diagonal baffles 17 instead of the single upper and single lower, as in the A and B sections. The internal ribs of course increase the heat dissipating surface of the section, whereas the diagonal baffles, which are higher than the longitudinal ribs or fins, break up any straight-line flow of the fluid. In the bend portion of the barrel there are less internal fins than in the longitudinal portion of the barrel, and this is true of the A and B sections as well as of the C and D sections. The reason for this is that the internal dimensions increases at the bend so that there is a greater internal wall area for the dissipation of heat and the curvature of the walls acts to deflect and disturb the flow of fluid so that more of the fluid comes into intimate contact with the metal walls of the section. It, moreover, facilitates the casting of the sections.

The provision of the internal fins in the bends has a further advantage, particularly in those sections where the distillate is going through the sections in the form of a gas because the curving fins tend to break up the straight-line flow of the gases at the end of the barrel and decrease the velocity of impingement of the gases against the inner walls of the section at the bends, thereby reducing the corrosive and erosive effect. It is a well-known fact that the sections tend to disintegrate and corrode most rapidly where the gas impingement is most severe. The internal fins, curving as they do, break up the direct force of the flow of the gases against the curved walls and thus retard the tendency toward disintegration at this point.

The C sections discharge into the D sections, which are similar to the C sections in all respects, except the vertical riser or connector $c^7$ of the section C is not provided on the D sections. The purpose of the riser $c^7$, of course, is to make direct connection into the lowermost B section of the stack. Connection from an upper C section to a lower D section is made through a U-shaped connector or loop 18 at the end of the unit. The C sections of two stacks placed in immediate juxtaposition have the abutting connector portions $c^4$ joined together, the joint being substantially the same as the joint described in detail in connection with Figure 8, a gasket such as that shown in Figure 9 being used. Where two stacks are spaced apart, as shown in Figures 1 and 2, a D section is connected between the connector portions $c^4$ of the C sections.

From this arrangement it will be seen that the only connection from the upper C sections to the lower D sections is through the return bend 18. With this arrangement the row of C sections constitutes, in effect, a manifold or header into which the various stacks of A and B sections discharge condensate, but instead of this header being straight, each section of it is looped so that the fluid has a long travel in passing from the B sections through the C sections to the lower D sections. Looking at Figure 2, for instance, all of the fluid discharging into the C section at the right-hand side of the unit has to travel the whole width of the unit through all the intervening C and D sections before it can flow out the return bend 18 into the lowermost D sections. The lowermost D sections are connected in series. The C sections are connected in series, while the groups of A and B sections are connected in parallel.

Figure 2:
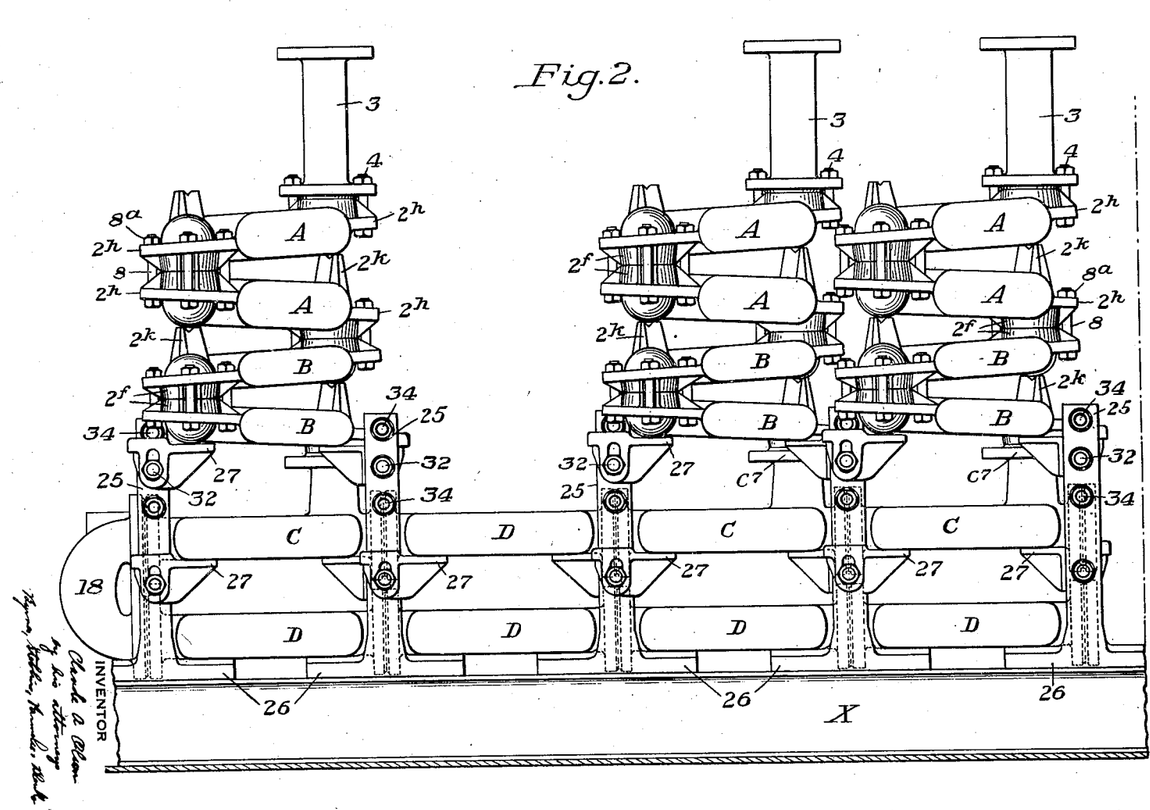
Figure 2 is a view similar to Figure 1 of what may be termed the "rear end" of the stack.

For closing the C section at the left-hand side of the unit in Figure 1, or the right-hand side of the unit in Figure 2, a plate 19 is sealed against the connector portion $c^4$ of the section C. The correspondingly positioned lowermost section D can discharge into a pipe 20 leading to a header or other collecting conduit as commonly provided in units of this kind.

The barrels of the D sections are designated $d^1$ and $d^2$, as shown in Figures 17 to 20, inclusive. The oppositely turned connector portions are designated $d^4$, while the bend connecting the two barrels is designated $d^3$, these corresponding to the similar parts of the C section. The internal fins are arranged just the same as the internal fins of the C sections and there are correspondingly positioned diagonal baffles. Corresponding reference numerals designate the internal fins and baffles of the C and D sections. The external dimensions, particularly the length and the width, of the D sections is the same as that of the C sections, and as above pointed out the C sections are as long and as wide as the A and B sections. This is of importance in connection with the supports which are used for the sections.

Figure 3:
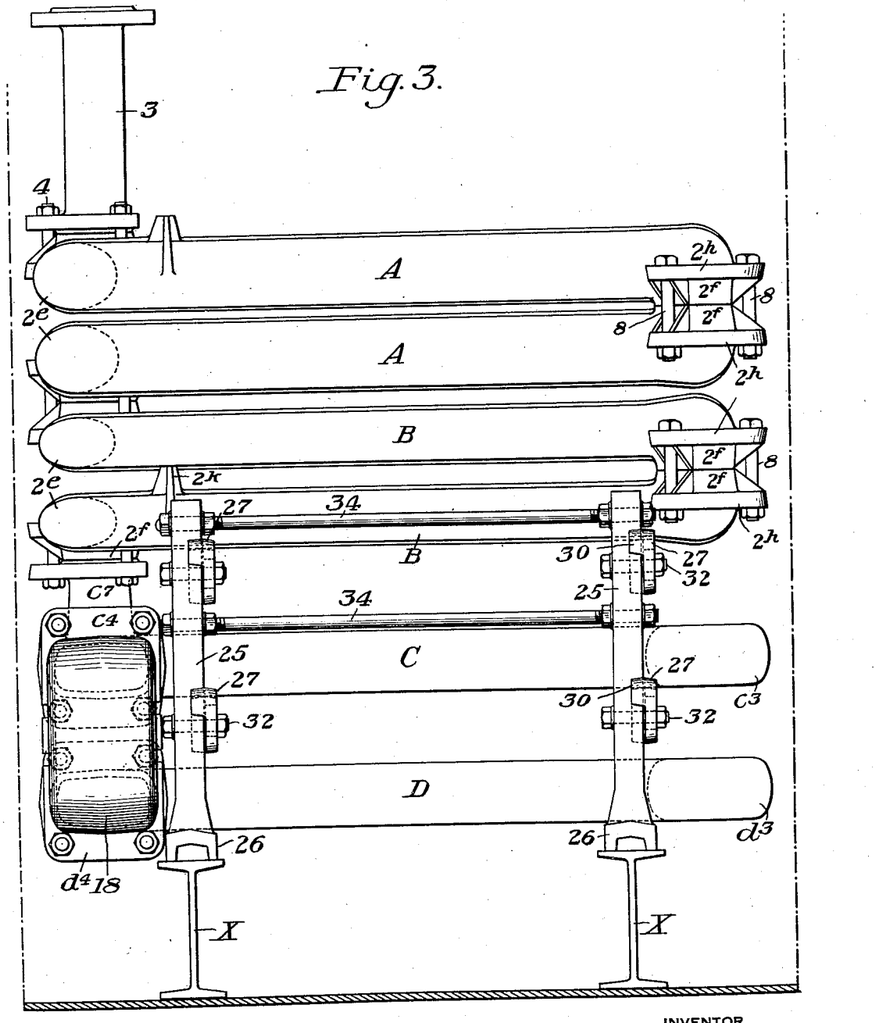
Figure 3 represents a side elevation of one of the stacks, but for the purpose of clarity some of the parts of the stack lying beyond the front face thereof and which would ordinarily be seen in elevation have been omitted.

According to my invention there is provided at each side of the stack a pair of posts 25 having feet portions 26 which set on I-beams on the floor of the tank in which the cooling unit is contained. One of these posts is located adjacent the front end of the stack, as shown in Figure 3, and one adjacent the rear end.

The lowermost D section in each stack rests on the feet portions 26 of the post, the I-beams being of sufficient height to hold the lowermost D sections clear of the floor so that water can circulate under them, and so that the couplings between sections can be easily made. Such cooling sections as are provided above the lowermost one are independently supported on the posts by vertically adjustable arms 27 which are carried on the posts. The construction and arrangement of these arms is best shown in Figures 24 to 26, inclusive.

Figure 26:
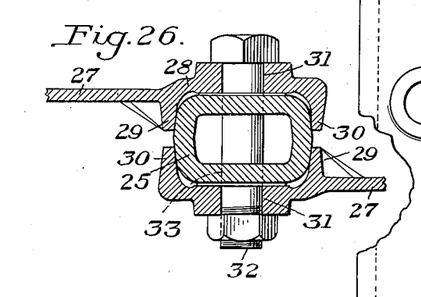
Figure 26 is a transverse section in the plane of line XXVI—XXVI of Figure 24.

The post itself is substantially oblong in cross-section, as shown in Figure 26. The arm 27 has an offset at 28, and at 29 and 30 are spaced apart lugs or ribs, these lugs or ribs being spaced a distance apart equal to the width of the post 25 so that the arm may be set against the post with the lugs 29 and 30 embracing it, as shown in Figure 26. When a load is put on the outer ends of the arm 28, it tends to tip or cant the arm, forcing the lug portions 29 and 30 to grip the post and thus hold the arm against vertical movement. In order to retain the arms on the post, but permit the free vertical adjustment thereof within definite limits, the arms have a vertical slot 31 in the offset portion thereof. A bolt 32 passing through a hole 33 in the post extends through the slot 31, and the head of the bolt, or the nut carried thereon, serves to retain the arm on the post. While the bolt and the nut may have some effect in frictionally clamping the bracket on the post, the main holding power results from the canting of the bracket on the post.

Figures 24, 25:
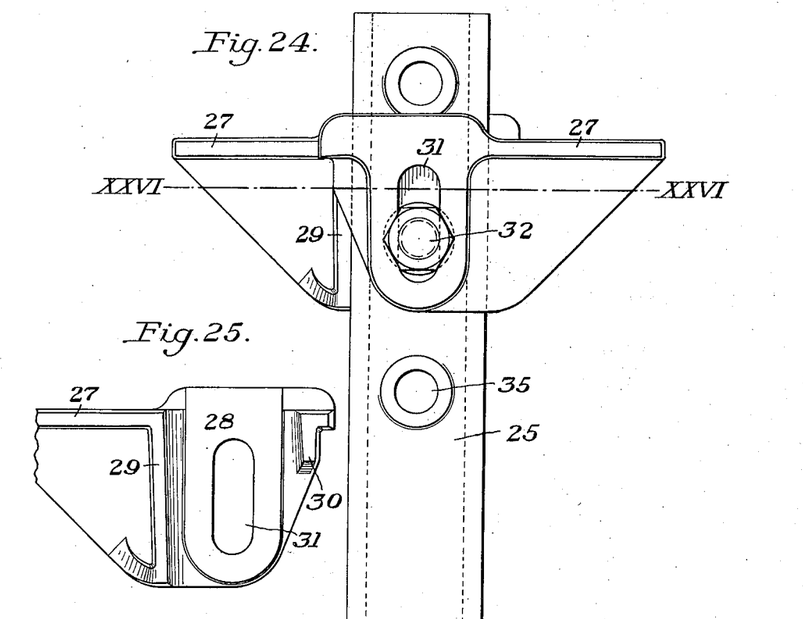
Figure 24 is a side elevation of one of the supporting posts.
Figure 25 is a detail view showing a side elevation of the inner end of one of the supporting brackets.

This arrangement allows the arm to be easily adjusted to the proper height within the limits permitted by the slot 31 and provides an arrangement in which there will be no slipping of the bracket vertically on the post. Since the arms are not always in a very accessible position, and are frequently difficult to get at, an arrangement of this kind is of considerable advantage because it is not necessary that the nut on the bolt 32 be screwed up tightly enough to frictionally clamp the bracket against movement relatively to the post.

Where two or more stacks are arranged side-by-side in a unit, as is frequently the case, a single post positioned between two stacks may be provided with oppositely extending arms 27, as shown in Figures 24 to 26, for supporting the sections of two adjacent stacks. The lugs 29 and 30 on the brackets are of such height, as shown in Figure 26, that they do not extend to the center line of the post, and consequently two brackets may be placed on the same post at the same level and project in opposite directions without interfering with each other and can be held by the same bolt 32.

This arrangement provides a very convenient and flexible arrangement for supporting the sections. As shown in Figure 2, the posts at the right-hand and the left-hand side of the unit are provided with only one set of brackets 27, while all of the other posts are provided with brackets that extend in opposite directions. Where two brackets extend in opposite directions they may be at the same level as when they support adjacent car D sections, or at different levels as where they support adjacent B sections, the B sections being transversely sloped.

In the particular arrangement shown, the lower D sections rest on the feet of the posts. The C sections are supported on the brackets 27, and the D section which connects two C sections is similarly supported. The lowermost C sections are also supported on brackets 27 carried on the same posts above the level of the brackets which support the C sections. Frequently an installation will have several D sections below the C section in each stack, and where this is done it is merely necessary to provide posts 25 of greater height. I have shown the minimum height post for any installation using all types of sections.

By reason of the fact that the C and D sections are of substantially the same overall width as the A and B sections, the posts 25 can be perfectly straight, and the brackets for supporting the B sections can be the same length as the brackets which support the C and D sections, so that all brackets 27 are interchangeable. Where the stacks are closely adjacent, as at the right-hand side of Figure 2, there is room between these closely adjacent sections for the posts.

Since each A and B section is directly supported by the section under it, it is only necessary that the post 25 be of sufficient height to provide for a bracket 27 which shall support the lowermost B section of the stack.

This type of support is of especial convenience in replacing sections in the stack. The A and B sections are adjacent the top of the stack and the joints are made by means of vertically extending bolts.

Consequently, where one of the A or B sections has to be replaced it is not especially difficult to remove the defective section. The C and D sections, however, are near the bottom of the tank and the joints are made through horizontally arranged bolts. By reason of the fact that the C and D sections are supported independently of one another and the A and B sections are supported independently of the C and D sections, any C or D section can be removed from the stack without disturbing the sections either above or below it. This is apparent from an examination of Figures 1, 2 and 3. To remove a C section, for instance, it is merely necessary to break the coupling at each of its ends and to break the vertical coupling with the B section immediately above it, and then slide the section forwardly until it is clear out of the stack. The portion of the stack above this C section will be supported on the upper brackets 27 on the posts 25, and it will of course be unnecessary to disturb any of the sections below it. A new section can be slipped into the place where the defective section has been removed and the joints made up. As the number of D sections in a stack increases, this convenience in the replacing of sections is of added importance. As previously stated, I have shown a stack with a minimum number of sections and in use usually more than a single D section to a stack is employed.

The supporting arrangement is a material improvement over the type of supports heretofore used wherein structural beams have to be mounted directly in the tank. The weight of the A and B sections is taken off the C and D sections altogether and transmitted downwardly through the posts 25. Likewise, the weight of any upper C or D section is taken off any lower D section and transmitted downwardly through the post 25. The posts 25 may be tied together by means of tie rods 24 passing through openings 35 in the posts 25 as shown in Figure 3.

The invention as described possesses several advantages over condensers as heretofore constructed. The use of condensing sections having smooth outer surfaces provides more effective cooling, and more effective condensation of the hot gases, particularly at the top of the stack. In the upper sections, where the fluid is largely of a gaseous nature, higher velocities are obtained. It is therefore desirable that the upper and intermediate sections have three legs in order to provide for a considerable length of gas travel.

Since there is a decrease in the volume of the gases upon cooling in the A sections, there is a definite advantage in having the cross-sectional area of the B sections smaller. When the volume of the liquid has become considerable, with the accumulation from several stacks to be provided for, the larger cooling sections with only two legs are provided. It is therefore of considerable advantage to provide the several types of sections in a single stack.

By reason of the fact that all of the sections have substantially the same overall dimensions, the vertical posts 25 can be conveniently used and bracket arms 27 which are interchangeable can be used in all positions on the posts. The arrangement of posts and brackets provides an easy way for assembling the sections and an arrangement wherein sections can be readily removed and replaced. Moreover, this type of support is one wherein the load is transmitted directly to the beams beneath the floor, eliminating the requirement for any structural supports inside of the tank.

By reason of the connection from the C section directly to the lowermost B section in each stack, the condensate and distillate can flow directly from the B sections into the C sections, eliminating the use of any manifolds, headers, or other types of external connections, such as have heretofore been required. This allows for a closer spacing in a vertical direction between the B sections and the C sections, thereby reducing the depth of the tank necessary to accommodate a stack.

It will be noted that in the connector portions $c^4$ and $d^4$ of the C and D sections, respectively, the fluid passage is the same cross-sectional shape and dimension as the inside of the barrel, whereas a circular gasket is used for making the joint. It is desirable not to alter the cross-sectional shape of the passageway in the connector portions of the sections, and it is also desirable to have a circular groove for the gasket so as to facilitate the grinding or machining thereof. The use of a joint throughout the unit wherein there is a circular groove in the face of the connector portion together with a gasket having a central rib for centering the same facilitates the lining up of the joint and provides an arrangement wherein a gasket will not be off-center with respect to the connector portion of the sections, and thus will not project into the passageway to obstruct the passage of the distillate therethrough.

While I have described my invention with considerable detail, it will be understood that various changes and modifications may be made in the specific construction and arrangement of parts within the contemplation of my invention and under the scope of the following claims.

I claim:

1. A cast metal condenser section having internal heat dissipating fins therein and baffles therein for preventing the straight-line flow of fluids through the section.

2. A condenser section comprising a member having two or more barrels, said barrels having a series of longitudinally extending fins therein, the fins being interrupted at intervals, and baffles at such interruptions.

3. A condenser section comprising an integral casting having two or more barrels, said barrels having a series of longitudinally extending fins therein, the fins being interrupted at intervals, and baffles at such interruptions, said baffles comprising diagonally disposed fins of greater height than the longitudinally extending fins.

4. A condenser section comprising a member having barrel portions which are connected by a bend portion, said barrel portions having longitudinally extending fins on the inner walls thereof, the number of fins in the bend portion being less than the number of fins in the barrel portion.

5. A condenser section comprising an integral casting having barrel portions which are connected at one end, said barrel portions having longitudinally extending fins on the inside thereof, and diagonally arranged baffles intermediate the ends thereof.

6. A condenser section comprising an integral metal casting having barrel portions, said barrel portions having a series of longitudinally extending internal fins in the bottom thereof and having a similar series of internal fins in the top thereof, and having a single internal fin along each side wall thereof in the plane of the parting line of the mold in which the casting is formed.

7. A condenser section comprising an integral casting having longitudinally extending barrel portions, longitudinally extending internal fins in the barrel portions, there being one series of fins on the upper wall of the barrel and one series of fins on the lower wall of the barrel, a diagonally extending baffle inside the barrel at the top thereof interrupting the fins, a similar baffle at the bottom thereof, the second baffle extending crosswise of the first.

8. A condenser section comprising an integral casting having longitudinally extending barrel portions, longitudinally extending internal fins in the barrel portions, there being one series of fins on the upper wall of the barrel and one series of fins on the lower wall of the barrel, a diagonally extending baffle inside the barrel at the top thereof interrupting the fins, a similar baffle at the bottom thereof, the second baffle extending crosswise of the first, said baffles being of greater height than the fins.

9. A condenser section comprising an integral casting having barrel portions which communicate, said barrel portions having a substantially smooth exterior surface and having a dividing rib along the top of each barrel and along the bottom of each barrel.

10. A condenser stack comprising a plurality of superimposed sections, the first section in the stack having three barrel portions, a succeeding section below the first also having three barrel portions but having a cross-sectional area less than the cross-sectional area of the first section, and another section below the second mentioned section having but two barrels the cross-sectional area of which exceeds the cross-sectional area of the barrels of either of the first or second mentioned sections.

11. A condenser stack comprising a plurality of superimposed sections, the first section in the stack having three barrel portions, a succeeding section below the first also having three barrel portions but having a cross-sectional area less than the cross-sectional area of the first section, and another section below the second mentioned section having but two barrels the cross-sectional area of which exceeds the cross-sectional area of the barrels of either of the first or second mentioned sections, the wall thickness of the first-mentioned sections being greater than the wall thickness of the succeeding sections.

12. In a condenser stack, a series of condensing sections arranged in superimposed relation and having three barrels, a series of intermediate sections arranged in superimposed relation and directly under the condensing section, the intermediate sections also having three barrels, and a series of cooling sections arranged in superimposed relation directly under the condensing and intermediate sections and having but two barrels, the cooling sections receiving condensate from the intermediate sections, all of said sections having substantially smooth exterior surfaces and having internal heat dissipating fins.

13. In a condenser stack, a series of condensing sections arranged in superimposed relation and having three barrels, a series of intermediate sections arranged in superimposed relation and directly under the condensing section, the intermediate sections also having three barrels, and a series of cooling sections arranged in superimposed relation directly under the condensing and intermediate sections and having but two barrels, the cooling sections receiving condensate from the intermediate sections, all of said sections having substantially smooth exterior surfaces and having internal heat dissipating fins, said intermediate sections being of smaller cross-sectional area than the first-mentioned condensing sections, the cooling sections being of greater cross-sectional area than the condensing and intermediate sections.

14. A condenser stack comprising a series of superimposed cast metal sections having three barrels above a series of superimposed cast metal sections having two barrels with means for delivering condensate from the three-barrel sections to the two-barrel sections, the two-barrel sections having the cross-sectional area of the barrel larger than the cross-sectional area of the barrels of the three-barrel sections, the barrels of all of the sections having longitudinally extending internal fins for increasing the heat dissipating surface thereof.

15. In a condenser stack assembly, a plurality of cast metal sections having three barrels, said sections being arranged in superimposed relation and arranged above a series of cooling sections also disposed in superimposed relation which have but two barrels, the uppermost cooling section having an upwardly opening connection thereon at the end of one of the barrels through which communication is established directly with the lowermost section having three barrels, all of the cooling sections having oppositely turned connector portions at the free ends of the barrels.

16. In a condenser stack, a superimposed series of sections having an upwardly directed inlet opening at one side of one end and a downwardly directed outlet opening at the opposite side of the other end, said inlet and outlet openings of each section registering with the correspondingly positioned openings of the sections immediately above and below it, superimposed cooling sections directly under said first sections having oppositely turned laterally directed connector portions at each side of one end thereof, the uppermost cooling section also having a vertically directed connector portion which registers directly with the outlet portion of the lowermost of said first-mentioned sections.

17. A condenser stack comprising a series of superimposed sections having three barrels, each section having an upwardly turned inlet opening at one end of one side thereof and a downwardly directed outlet opening at the opposite side on the other end thereof, the inlet and outlet openings of the successive sections registering, and a cooling section having two barrels with a laterally turned connector portion on the free end of each barrel, the free end of one of the barrels also having a vertically directed connector portion which is positioned directly under the outlet opening of the lowermost three-barrel section, there being a connection between the outlet opening of the lowermost three-barrel section and said connector portion of said two-barrel section, whereby fluid may flow directly from the lowermost three-barrel section into the two-barrel section.

18. A condenser stack comprising a plurality of sections arranged in superimposed relation, and means for independently supporting some of the sections comprising posts positioned adjacent the stack, and brackets on the posts extending under the sections which are to be independently supported, whereby the independently supported sections can be removed and replaced without disturbing the adjacent upper and lower sections.

19. A condenser stack comprising a plurality of sections arranged in superimposed relation, and means for independently supporting some of the sections comprising posts positioned adjacent the stack, and brackets on the posts extending under the sections which are to be independently supported, whereby the independently supported sections can be removed and replaced without disturbing the adjacent upper and lower sections.

20. A condenser stack comprising a plurality of superimposed condenser sections, a plurality of superimposed cooling sections immediately under the condensing sections, the cooling and condensing sections being of substantially the same overall width, posts positioned beside the stack, and brackets on the posts extending under the lowermost of the condensing sections for supporting the condensing sections independently of the cooling sections, and other brackets on the posts extending under some of the cooling sections for supporting the cooling sections independently of each other, whereby such independently supported cooling sections may be removed and replaced without disturbing the other sections in the stack.

21. A condenser stack comprising a plurality of superimposed condenser sections, a plurality of superimposed cooling sections immediately under the condensing sections, the cooling and condensing sections being of substantially the same overall width, posts positioned beside the stack, brackets on the posts extending under the lowermost of the condensing sections for supporting the condensing sections independently of the cooling sections, and other brackets on the posts extending under some of the cooling sections for supporting the cooling sections independently of each other, whereby such independently supported cooling sections may be removed and replaced without disturbing the other sections in the stack, said posts having laterally extending feet portion thereon on which the lowermost cooling section of the stack rests and by means of which said lowermost section is supported above the floor on which the posts set.

22. The combination with a condenser stack comprising a series of superimposed sections, of means for supporting some of the sections independently of the sections beneath them, whereby some of the sections may be removed and replaced without disturbing others in the stack.

23. The combination with a condenser stack comprising a series of superimposed sections, of means for supporting some of the sections independently of the sections beneath them, whereby some of the sections may be removed and replaced without disturbing others in the stack, said means comprising posts placed alongside the stack and having laterally extending brackets thereon which extend under the sections to be supported, said brackets being vertically adjustable, whereby the sections may be set at the proper level.

24. The combination with a condenser stack comprising a plurality of superimposed sections, of posts positioned adjacent the stack, and bracket arms having a recessed portion which embraces the post, said bracket arms being provided at different heights on the post, the bracket arms projecting under various sections of the stack to be supported, and means for retaining the bracket arms on the posts.

25. A condenser unit comprising a plurality of separate cast metal sections having abutting connector portions with communicating passages, the abutting connector portions having registering circular grooves in the faces thereof, and a gasket between the abutting portions of the sections having a bead on each face thereof, this bead extending into the grooves in the abutting faces of the sections and serving to center the gasket and assist in alining the sections.

26. In a condenser having superimposed communicating sections each of which has connected barrel portions, said barrel portions having a rib extending therealong, one section having a vertically extending lug thereon which engages the surface of an adjacent section, said lug having a notch therein to receive the rib on the barrel of the adjacent section which it engages.

27. A condenser section having internal heat dissipating fins therein extending longitudinally thereof, and baffles therein for preventing the straight-line flow of fluid through the section.

28. A condenser section comprising a tubular barrel member having a series of longitudinally extending fins on the inside thereof, the fins being interrupted at intervals, and baffles at such interruptions, said baffles comprising diagonally disposed fins of greater height than the longitudinally extending fins.

In testimony whereof I have hereunto set my hand.

CLAUDE A. OLSON.